Nov. 30, 1948.                    G. A. GEDDES                    2,454,917
                BRAKE AND CLUTCH MECHANISM FOR TRANSMISSIONS
Filed June 15, 1944                                          2 Sheets-Sheet 1

Inventor
George A. Geddes
By Robert M. Dunning
Attorney

Patented Nov. 30, 1948

2,454,917

UNITED STATES PATENT OFFICE 2,454,917

BRAKE AND CLUTCH MECHANISM FOR TRANSMISSIONS

George A. Geddes, Minneapolis, Minn.

Application June 15, 1944, Serial No. 540,449

4 Claims. (Cl. 192—18)

My invention relates to an improvement in transmission, wherein it is desired to provide a means of transmitting power from two separate sources to a driven element, or in transmitting power from a drive element to two driven elements.

In the transmission of power from two separate elements to a driven element, difficulty is sometimes experienced in providing a smooth flow of power to the driven element. It is sometimes difficult to transmit power in such a manner that little or no strain is placed upon the drive units or the driven elements.

It is the object of the present invention to provide an apparatus in which either or both of two separate power elements may be connected to a single driven element without strain or damage to any of the connections.

A feature of the present invention lies in the provision of clutch means connecting each of two power sources to a driven element. Thus the driven element may be disconnected from either or both of the drive units as is desired.

A further feature of the present invention lies in the provision of a brake means for halting rotation of the drive element when it is not in use. For example, if the drive element is a wind actuated propeller, or the like, this propeller may be held stationary while not connected to the driven unit.

A further feature of the present invention lies in the provision of a structure in which two separate power supply units are normally clutch connected to a driven element, and in the provision of a means for releasing one or both clutches when it is so desired. As a result the drive units ordinarily operate at the same speed, but the speed of one may vary to some extent if one of the connecting clutches is permitted to slip.

While my device is particularly designed to connect two separate sources of power supply to a driven element, it is obvious that a single driving element may operate to drive two driven elements through suitable clutch means. In such an arrangement, the driven elements may be held from rotation while not in use.

These and other objects and novel features of my invention will be more clearly and fully set forth in the following specification and claims.

In the drawings forming a part of my specification:

Figure 1:
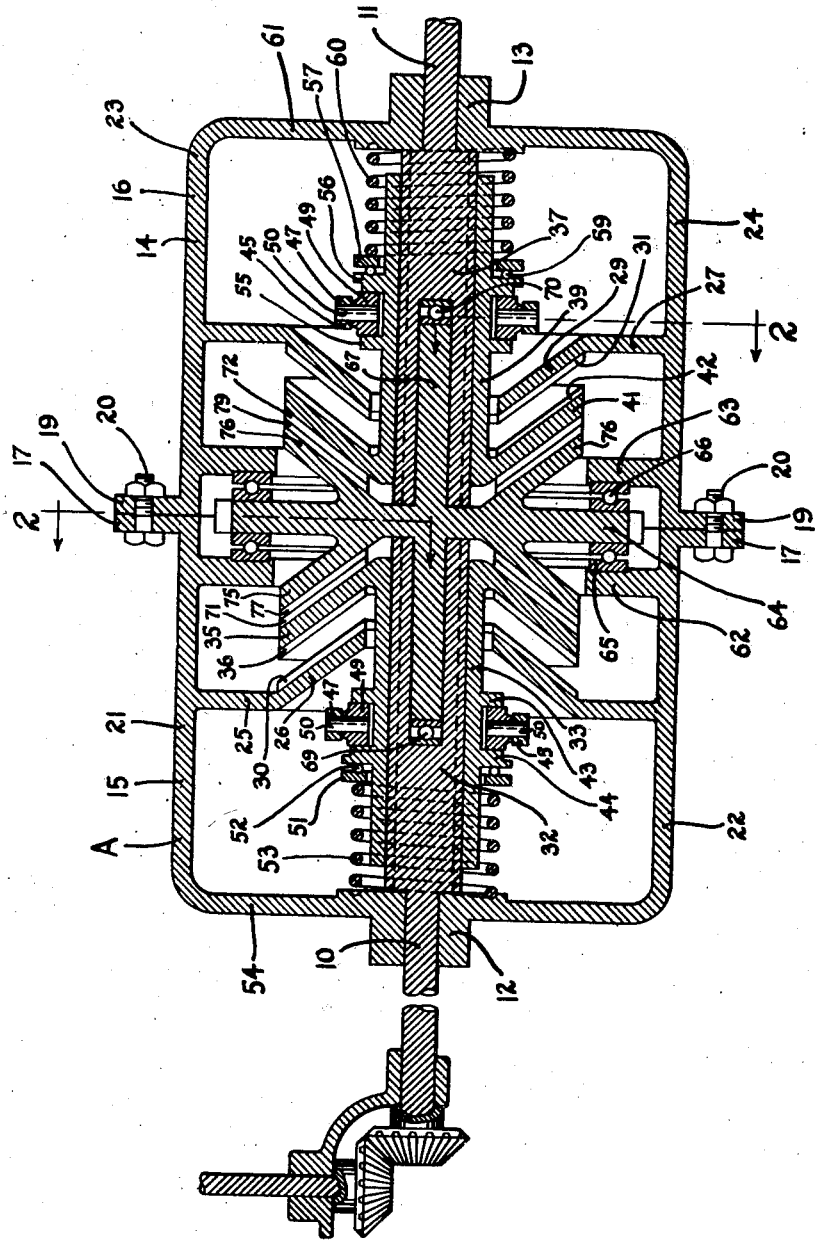
Figure 1 is a sectional view of a transmission showing the construction thereof.

The transmission A is shown including a drive shaft 10 and a second aligned drive shaft 11. The shafts 10 and 11 extend through suitable means 12 and 13 respectively in the transmission housing 14.

The housing 14 is longitudinally separated into two halves 15 and 16. Each of these casing sections is provided with a flange at the open end thereof. The flange on the casing section 15 is designated by the numeral 17, while the flange on the section 16 is designated by the numeral 19. Bolts 20 extend through the flanges 17 and 19 to bolt the casing sections together.

Figure 2:
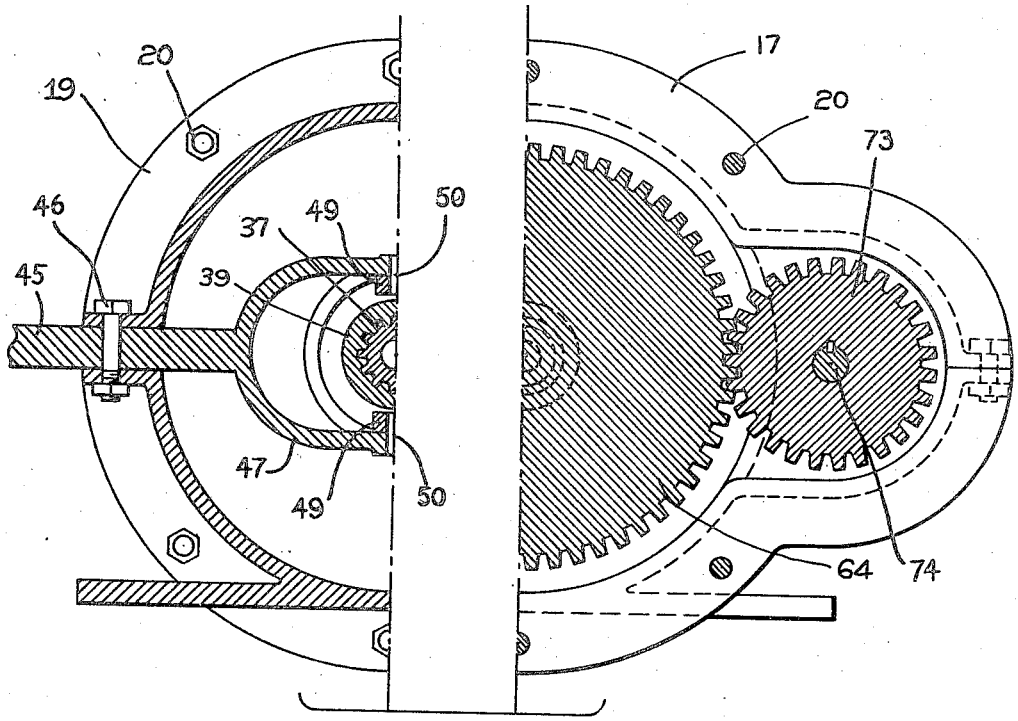
Figure 2 is a sectional view on the line 2—2 of Figure 1.

As best illustrated in Figure 2 of the drawings the casing is also split longitudinally in preferred form, dividing the casing section 15 into upper and lower sections 21 and 22 respectively. The casing section 16 is divided into upper and lower sections 23 and 24 respectively. This division of the casing 14 into four connected parts permits ready assembly of the various elements.

Extending inwardly from the inner walls of the cylindrical casing 15, I provide a ring-like flange 25 which terminates in an inclined cone-shaped flange 26. The casing section 16 is likewise equipped with an inwardly extending ring-shaped flange 27 which terminates in a cone-shaped flange 29. The cone-shaped flanges 26 and 29 are provided with a friction surface 30 and 31 respectively of any suitable material such as clutch facing material, brake lining or the like.

The diameter of the shaft 10 is increased internally of the housing section 15 to provide a relatively large diameter portion 32. A sleeve 33 is slidably keyed to the shaft portion 32 to slide longitudinally with respect thereto. The inner extremity of the sleeve 33 is equipped with a cone-shaped flange 35. The flange 35 is provided with a friction surface 36 of any suitable material. The shaft 11 is increased in diameter inside of the casing section 16 to provide a large diameter portion 37. A sleeve 39 is slidably mounted upon the shaft portion 37 and is keyed thereto to rotate with the shaft. The sleeve 39 is provided at its inner extremity with a cone-shaped flange 41. A layer of friction material 42 of any suitable type is mounted upon the flange 41.

A pair of integral ring-shaped flanges 43 and 44 are provided on the sleeve 33 at a point spaced from the ends thereof. A lever 45 is pivotally secured to the casing 14 and is illustrated extending therefrom. The lever 45 which is pivoted at 46 is provided with a bifurcated end 47, each fork 55 of which supports a roller 49 by means of a pivot 50. As a result the sleeve 33 may be moved in either direction by the forked lever 45.

A ring 51 is separated from the flange 44 by means of an anti friction bearing 52. A spring 53 encircles the sleeve 33 between the ring 51 and the end 54 of the casing section 15. The spring 53 urges the ring 51 and accordingly the sleeve 33 inwardly away from the wall 54, thus normally holding the friction surfaces 30 and 36 separated.

The sleeve 37 is provided with a pair of spaced flanges 55 and 56. A second arm 45 pivoted to the casing section 16 by the pivot 46 is provided with a bifurcated end 47. Each fork of the lever 45 supports a pivot 50 upon which is mounted a roller 49 engaged between the flanges 55 and 56. By pivoting the lever 45 the sleeve 39 may be operated in either direction.

It will be noted that both of the levers are provided with the same designating numerals. This is done in view of the fact that both levers are identical and every part of these levers is the same.

A ring 57 is spaced from the flange 56 by means of an anti friction bearing 59. A spring 60 encircles the sleeve 39 and extends between the closed end 61 of the casing section 16 and the ring 57. The ring, and accordingly the sleeve 39, is thus urged away from the wall 61, thus normally separating the friction surfaces 41 and 42.

A ring-shaped flange 62 extends inwardly from the cylindrical wall of the casing section 15. A similar ring-shaped flange 63 extends inwardly from the casing section 16. A gear 64 is positioned between the flanges 62 and 63. Anti friction bearings 65 and 66 space the gear 64 from the flanges 62 and 63 respectively and absorb end thrust exerted against the gear 64.

This gear 64 is supported by a shaft 67 which extends into the inner ends of the enlarged portions 32 and 37 of the shafts 10 and 11. These shafts 10 and 11 are axially bored to accommodate the shaft 67. Thrust bearings 69 and 70 are provided between the ends of the shaft 67 and the bottom of the bores or recesses in which the shaft is supported.

The flanges 35 and 41 are equipped with friction rings 71 and 72 thereupon on the sides thereof opposite the friction surfaces 36 and 42. These friction surfaces are normally urged against the cone-shaped flanges 75 and 76 on opposite sides of the gear 64 by the pressure of the springs 53 and 60. The flanges 75 and 76 may also bear a friction surface 77 and 79 if desired. Thus as the shaft 10 rotates the sleeve 33 which is splined or keyed thereto also rotates and the spring 53 urges the friction surface 71 against one side of the gear 64. Similarly as the shaft 11 rotates, carrying the sleeve 39 therewith, the friction surface 72 is urged by the spring 60 into engagement with the opposite surface of the gear 64. Thus both shafts 10 and 11 are normally connected to the driven gear 64.

When it is desired to disconnect either of the shafts 10 or 11 from the gear 64, it is only necessary to operate one of the levers 45 so as to pivot the corresponding friction surface 71 or 72 out of contact with the gear 64. If it is desired to stop rotation of either shaft 10 or 11, this may be accomplished by continuing pivotal motion of the corresponding lever 45 so that the friction surfaces 30 and 36 are in engagement, or the friction surfaces 31 and 42 are engaged. Such friction engagement tends to brake the corresponding shaft and to hold the same stationary.

The gear 64 may rotate any driven device by any suitable means. Figure 2 illustrates a gear 73 which is in mesh with the gear 64 and which is provided with a shaft 74 which may extend out of the casing and connect to any suitable member.

When the drive unit includes the shafts 10 and 11, the shaft 74 comprises the driven shaft. This driven shaft may be operated by either the shaft 10 or the shaft 11, by both shafts 10 and 11, or by neither of these shafts as desired.

If desired the shaft 74 may comprise the drive shaft, acting through the gears 73 and 64 to selectively drive either or both of the shafts 10 and 11.

In accordance with the patent statutes, I have described the principles of construction and operation of my transmission and while I have endeavored to set forth the best embodiment thereof, I desire to have it understood that obvious changes may be made within the scope of the following claims without departing from the spirit of my invention.

I claim:

1. A transmission comprising a casing, a pair of spaced aligned shafts supported by said casing, a coaxial gear supported between said shafts, a pair of friction means on said gear, a clutch means slidably mounted upon each of said shafts for movement toward or away from said gear, means for moving said clutch means toward or away from said gear, said clutch means comprising an outwardly extending flange having a friction surface on opposed faces thereof, friction means on said casing, certain of said friction surfaces on said flanges engaging corresponding friction means on said gear when moved toward said gear and the other friction surfaces on said flanges engaging the corresponding friction means on said casing when said flanges are moved away from said gear to hold the corresponding clutch means and shaft upon which it is mounted from rotation.

2. A transmission comprising a casing, a pair of axially aligned shafts supported by said casing, a coaxial gear supported between said shafts, friction means on said gear, a clutch means slidably supported on each of said shafts for movement toward or away from said gear, means for moving said clutch means toward or away from said gear, an outwardly extending flange forming a part of each clutch means, a friction surface on one side of said flanges engageable against the friction means on said gear in one position of said clutch means, friction surfaces on the other side of said flanges, and stationary means on said casing against which the second friction surfaces may engage in a second position of said clutch means when the same is moved away from said gear.

3. A transmission comprising a casing, a pair of spaced aligned shafts supported by said casing, a gear rotatably supported between said shafts, a pair of friction means on said gear, a sleeve slidably supported on each of said shafts for movement toward or away from said gear, means for moving said sleeves toward or away from said gear, a cone shaped flange supported by each of said sleeves, friction surfaces on each side of said flanges, one friction surface of each flange being engageable with one of said friction means on said gear when moved toward said gear, and means on the casing engageable with the remaining friction surfaces of said flanges when said flanges are moved away from said gear.

4. A transmission comprising a casing, a pair of aligned shafts supported by said casing, a coaxial gear supported between said shafts, a pair of friction means on said gear, a sleeve slidably mounted on each of said shafts for movement toward or away from said gear, means for moving said sleeves toward or away from said gear, a cone shaped flange on each of said sleeves, friction surfaces on one side of each of said flanges, means on said casing against which said friction surfaces may engage, and friction surfaces on the other side of said flanges engageable against said friction means on said gear when said flanges are moved toward said gear.

GEORGE A. GEDDES.

REFERENCES CITED

The following references are of record in the file of this patent:

UNITED STATES PATENTS

| Number | Name | Date |
|---|---|---|
| 442,380 | Lavigne | Dec. 9, 1890 |
| 899,247 | Drake | Sept. 22, 1908 |
| 1,461,800 | Lewis | July 17, 1923 |
| 1,865,022 | Larson | June 28, 1932 |
| 1,865,129 | Menhall | June 28, 1932 |
| 2,101,484 | Vermette | Dec. 7, 1937 |